(12) United States Patent
Chung

(10) Patent No.: US 6,187,135 B1
(45) Date of Patent: Feb. 13, 2001

(54) PROCESS FOR MAKING RECYCLED PAPER HAVING IMPROVING STRENGTH PROPERTIES

(76) Inventor: Sun Ho Chung, 83-19, Chungdam-dong, Kangnam-ku, Seoul (KR)

(*) Notice: Under 35 U.S.C. 154(b), the term of this patent shall be extended for 0 days.

(21) Appl. No.: 09/299,917

(22) Filed: Apr. 28, 1999

(30) Foreign Application Priority Data

Mar. 30, 1999 (KR) .................................................. 99-10993

(51) Int. Cl.$^7$ .................................................. D21B 1/08
(52) U.S. Cl. ........................................ 162/4; 162/7; 162/8
(58) Field of Search ........................... 162/4, 5, 6, 7, 162/8

(56) References Cited

U.S. PATENT DOCUMENTS

| | | | |
|---|---|---|---|
| 3,766,001 | 10/1973 | Gleason et al. | 162/8 |
| 3,865,684 | 2/1975 | Gleason et al. | 162/8 |
| 4,154,675 | * 5/1979 | Jowett et al. | 210/33 |
| 5,011,741 | * 4/1991 | Hoffman | 428/503.1 |
| 5,227,019 | * 7/1993 | Borchardt | 162/6 |
| 5,227,021 | * 7/1993 | Hernesniemi et al. | 162/17 |
| 5,700,354 | 12/1997 | Virnelson et al. | 162/143 |
| 5,795,377 | 8/1998 | Tanner et al. | 106/164.4 |

FOREIGN PATENT DOCUMENTS

| | | |
|---|---|---|
| 2917814 | 11/1980 | (DE) . |
| 2091576 | 8/1982 | (GB) . |
| 58-180698 | 10/1983 | (JP) . |
| 8-188999 | 7/1996 | (JP) . |
| WO 97/38164 | 10/1997 | (WO) . |

OTHER PUBLICATIONS

Lavigne. J.R. "Instrumentation...Paper Industry", Miller McFreeman Publications, pp. 207–208, 1979.*

* cited by examiner

Primary Examiner—Dean T. Nguyen
(74) Attorney, Agent, or Firm—Arent Fox Kintner Plotkin & Kahn

(57) ABSTRACT

A process for the manufacture of recycled paper having improved strength properties is achieved by replacing refiners by agitators, modifying extractor, applying effective amount of dispersion aids, and applying appropriate amount of dry strength additives.

11 Claims, 2 Drawing Sheets

PROCESS FOR MAKING RECYCLED PAPER HAVING IMPROVING STRENGTH PROPERTIES

BACKGROUND OF THE INVENTION

1. Field of the Invention

The present invention is directed to the paper making arts, more particularly to a process for the manufacture of a recycled kraft paper having improved strength properties comparable to that made from virgin pulps. Such papers find particular application in the inexpensive substitutes for papers made from expensive virgin pulps. The container making arts, particularly, in the field of kraft paper sacks and plastic laminated sheets for containers, had to use kraft papers made from virgin pulps because the strength properties of recycled papers deteriorate fast as the number of recycling increases. But the use of virgin pulps consumes much of the natural timber resources. Thus, it would be beneficial to improve strength properties of recycled papers and replace much of the kraft papers made from virgin pulps.

2. Description of the Related Art

A typical stock preparation process for recycled paper stocks is roughly described by the FIG. 1. A high consistency furnish (4~8%) is formed at the pulper where waste paper is defibered by water. Heavy contaminants in furnish are eliminated by high-consistency cleaners and large size but relatively light contaminants in furnish are eliminated by turbo-separators. In addition to cleaning and screening, the pulper, high-consistency cleaners and turbo-separators perform dispersing of fibers in waste papers.

This is the reason why the process is called by another name, primary dispersion process.

More water is added to the high-consistency furnish at the low-consistency chest (below 1%) and transmitted to low-consistency cleaners and pressure screens for additional cleaning and screening to eliminate small size contaminants from furnish.

At the final stage of low-consistency cleaning and screening process, contaminated water in furnish is replaced with fresh water by an extractor. Then the out put of cleaned furnish undergoes refining process where mechanical beating and kneading on cellulose fibers in furnish is done.

Then the refined furnish is transported to a mixing chest where chemical additives are added and mixed. The machine chest receives furnish from mixing chest and stores it until it is sent to paper machine.

Although refining is essential for virgin fibers, refining recycled fibers that went through refining process already at the first occasion deteriorates fiber quality because refining will easily tear fibrils apart from fiber bodies turning them into fibril fragments. This results in the deterioration of strength properties of recycled paper. But they keep refining recycled fibers simply because it is recognized as the only means to control the freeness of furnish.

In the art of paper recycling, deterioration in strength properties of recycled paper has been taken as unavoidable and, therefore, more attention has been given to immediate problems such as de-inking and stickies control than to restoration of strength properties.

Moreover, the need for improving the strength properties of recycled paper has not been so serious. It is because either it has been tolerable in most cases of recycled paper usage or surmountable by the use of virgin pulps and dry-strength additives in paper manufacturing process. But this means that the strength of paper has been achieved at the cost of high priced natural resources such as virgin pulps.

SUMMARY OF THE INVENTION

In one embodiment the invention is directed to a stock preparation process for recycled paper wherein a furnish is prepared by pulping, cleaning, screening, extracting, and refining recycled fibers, characterized in:

Removing refiners, eliminating fibril fragments from furnish, adding dispersion aids to the pulper, maintaining a pH of furnish at least 5.5 and at highest 6.5, and applying dry strength additives to furnish.

In another embodiment, the invention is directed to a stock preparation process for recycled paper, separation of hydrogen bonds of recycled fibers is achieved by replacing refiners with ultrasonic and/or mechanical furnish agitators.

In still further embodiment, the invention is directed to a stock preparation process for recycled paper, elimination of fibril fragments from furnish is accomplished by enlarging holes and controlling the rotating speed of screens used in extractors.

A further embodiment discloses a process of stock preparation for recycled fibers characterized in the following steps:

(a) adding effective amount of NaOH to pulper,
(b) eliminating fibril fragments from furnish by extractor,
(c) removing refiners from the stock preparation process,
(d) employing ultrasonic and/or mechanical furnish agitators,
(e) applying appropriate amount of ALUM to the mixing chest to control the pH of furnish, and
(f) applying dry strength additives to the mixing chest.

Figure 1:
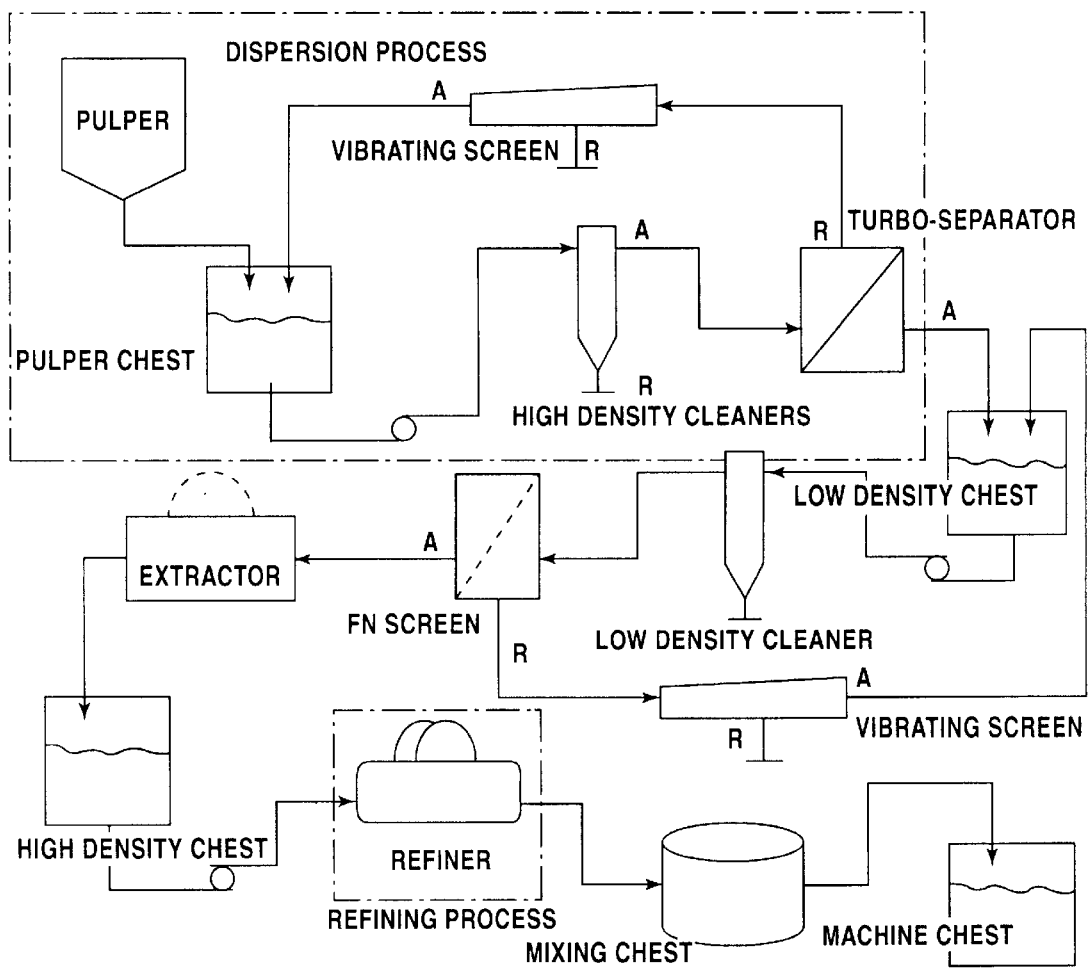
FIG. 1 is a schematic description of conventional paper stock preparation process for waste paper recycling.
Figure 2:
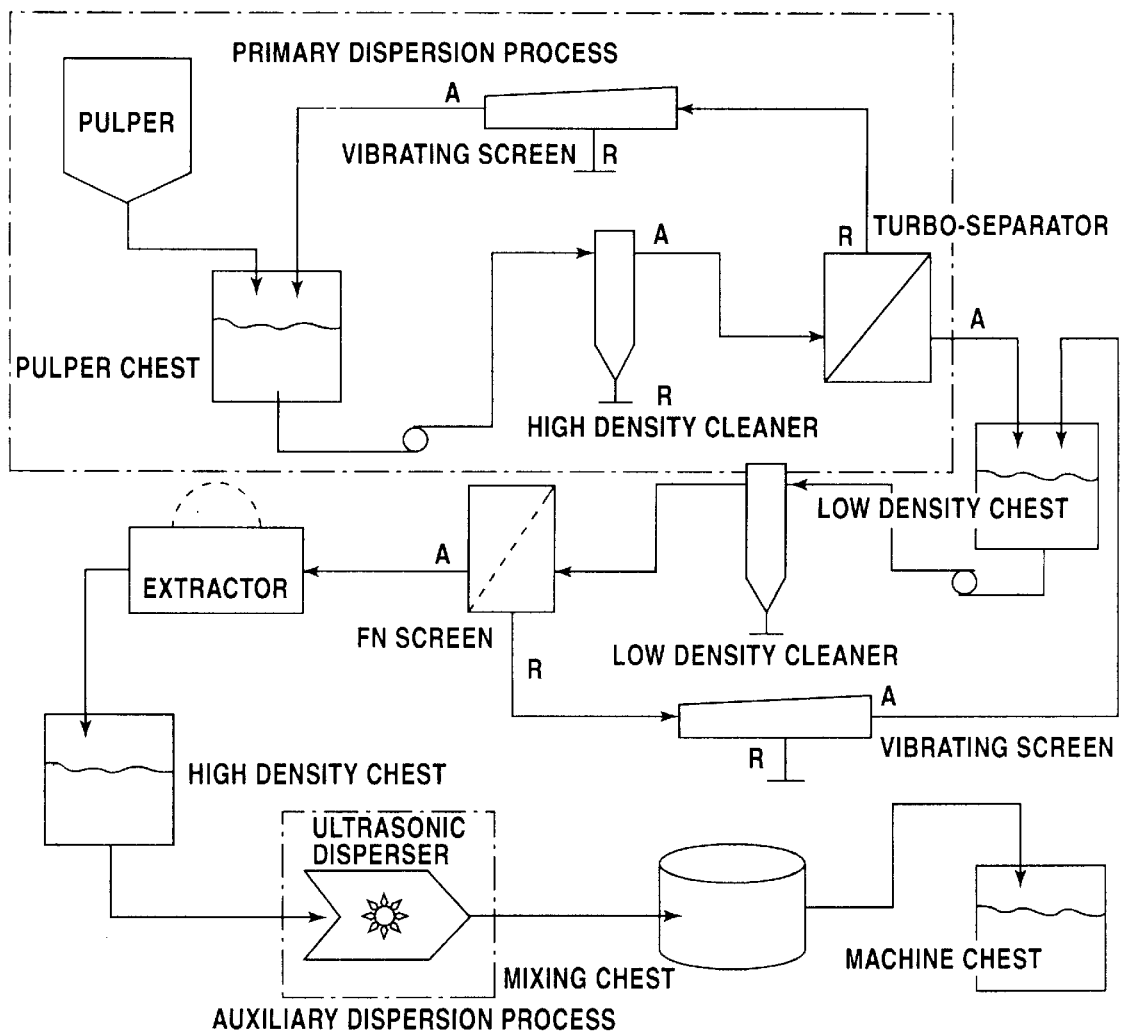
FIG. 2 is a schematic description of this invention applied to stock preparation process described by the FIG. 1.

| <Nomenclatures> | |
|---|---|
| 1: Pulper | 2,2': Vibrating Screens |
| 3: Pulper Chest | 4: High Density Cleaners |
| 5: Turbo Separator | 6: Low Density Chest |
| 7: Low Density Cleaners | 8: FN Screens |
| 9: Extractor | 10: High Density Chest |
| 11: Refiners | 12: Agitators |
| 13: Mixing Chest | 14: Machine Chest |

DETAILED DESCRIPTION OF THE INVENTION

The objective of this invention is to introduce effective means to restore strength properties of paper made from 100% recycled paper stocks to the level specified by national standard organizations so that it may be used as low price substitutes for papers that uses virgin pulps.

A series of tests that lasted about five months time to improve strength properties of recycled paper produced in a small paper mill from 100% waste papers such as OCC and kraft paper sacks, lead to the discoveries on the causes of strength deterioration of recycled paper, which are;

(1) Insufficient pulping and dispersion, which caused the loss of long fibers in the process of screening and cleaning.

(2) Excessive accumulation of fiber fragments and small size particles, which reduced RBA(relative bonding area) between fibers.

(3) Refining process, which tears off fibrils from fiber bodies and grinds them into fibril fragments.

(4) Acidity of paper furnish, that made fibers in furnish stiff resulting in additional reduction in RBA.

All of these reduced tensile strength of recycled paper.

Accordingly, the technical objectives are set to develop appropriate means to eliminate those causes outlined above. To summarize them, they are:

(1) Selecting appropriate additives that will help dispersion of hydrogen bond fibers in the process of pulping, screening and cleaning without tearing fibrils apart from fiber bodies. And increase in pulping time and the consistency of furnish are required.

(2) Improving eliminating efficiency of fibril fragments and particles from recycled furnish by modifying extractor screen and its rotating speed.

(3) Replacing conventional refining process by another process of dispersion to restore the freeness of recycled furnish to the level required for maximum strength without deteriorating fiber qualities.

(4) Selecting appropriate dry strength additives that are needed to compensate for the loss of strength in recycling process.

(5) Deciding on the degree of acidity of the furnish at the head-box of paper machine by means of applying ALUM into mixing chest

EXAMPLES

The tensile strength of recycled paper sheet, having basis weight of 83 g per square meter, made from a furnish (50% OCC and 50% waste kraft sacks), pH 4.7 at head-box, refined by two DDRs and a SDR to 31 degree of fineness, was measured to be 4.0 Kgf. The machine speed was 120 M/min. When dry strength additives are used, it went up to 5.1 Kgf at the basis weight of 77.7 g per square meters.

Next experiment was conducted with 100% imported OCC having much longer and stronger fibers. The change to imported OCC (with the same amount of dry strength additives used in the previous experiment) improved the strength of recycled paper sheet to 5.5 Kgf at the basis weight of 77.2 g but this is hardly enough to meet specification (6.8 Kgf) set by KS.

Based on common sense notion that strength of paper depends mostly on the strength of materials used, the next trial production was conducted by adding 20% of UKP to 80% of imported OCC (with the same amount of dry strength additives used in the previous experiment). This resulted in attaining 5.65 Kgf at the basis weight of 83.44 g.

When refining process is bypassed, the tensile strength was improved by 1.0 Kgf even if dry strength additives were not used. This replacement enabled consistent achievement of tensile strength above 5.7 with imported OCC and dry strength additives. This verifies the fact that refining process deteriorates the strength properties of paper when recycled paper stock is used. It leads to a conjecture that refining tears fibrils apart from the fiber body and/or grinds these fibrils into independent fibril fragments, which interfere with strength enhancing hydrogen bonds between fibrillated fibers.

Therefore, it is necessary to introduce effective means to eliminate these fibril fragments from furnish. An additional function of eliminating fibril fragments from furnish was given to the extractor by enlarging the holes and changing the rotating speed of the screens being used in the extractor. In actual test productions, the elimination of fibril fragments from furnish by replacing 50 mesh screen by 30 mesh screen improved the tensile strength up to 6.7 Kgf at the basis weight of 80 g per square meters.

When the removal efficiency of extractor is improved further, the tensile strength reached 7.0 at the basis weight of 80 g. For example, in a test production that used 70% waste kraft sacks and 30% OCC with dry strength additives such as 14 Kg of Superex-1726 (Anionic-PAM) and 5 Kg of Superex-3526 (Cationic-PAM) at each OD ton, the tensile strength of the paper sheets reached 7.5 Kgf. The basis weight was 85 g per square meters. The amount of NaOH was 3 Kg per each 18 lube pulping run.

The significance of this invention comes from the fact that it does not employ traditional method of furnish fractionation that separates short fibers from long ones. It simply eliminates fibril fragments from furnish and, therefore, short fibers originated from the medium of OCC remain in furnish.

Manufacturing strong kraft papers from OCC by means of traditional technology of fractionation was possible only by separating short fibers from long ones. This implied additional equipment and/or production system to take care of separated short fibers. But this invention provides ways to use short fibers without much loss of them in kraft paper production. Moreover, short fibers contribute merits to the strength properties of recycled paper because it improves not only stretch of paper resulting in improved TEA (tensile energy absorption) but also tensile strength in CD.

Finally it can be summarized that this invention makes it possible to manufacture kraft papers that exceed specifications set by national standards with respect to CD tensile strength, stretch and TEA from 100% recycled materials such as OCC and waste kraft sacks without using virgin pulps. This invention provides effective ways to replace high priced virgin pulps by OCC and old kraft paper sacks resulting in savings of natural timber resources, and in reducing manufacturing cost of kraft papers, subsequently leading to cost savings in paper container manufacturing.

What is claimed is:

1. In an improved process for making recycled paper wherein fibers in waste paper stocks are dispersed, extracted from cleaned and screened furnish, refined to achieve required level of freeness of a furnish, and deposited on a wire and dewatered, the improvement comprising a process for improving strength properties of recycled paper comprising the steps of:
replacing disk refiners, beaters and kneaders by agitators;
removing fibril fragments from cleaned and screened furnish by a fiber extractor that extracts fibril fragments and does not extract short and long fibers;
applying an effective amount of dispersion aids to a pulper;
maintaining a pH of furnish at a head box of paper machine at least 5.5 and at highest 6.5;
applying an appropriate amount of dry strength additives to furnish.

2. The process of claim 1 wherein the furnish is a mixture of stock and water and the stock is a pulp recycled from old corrugated cartons, old kraft paper sacks, waste paper and mixture thereof.

3. The process of claim 1 wherein the improvement in strength properties of recycled paper comprising separating hydrogen bonds of recycled fibers in the furnish.

4. The process of claim 3 wherein the separation of hydrogen bonds of recycled fibers is accomplished by ultrasonic or mechanical agitators installed along the path through which the furnish is transported from the said extractor to mixing chest in the stock preparation line.

5. The process of claim 4 wherein the freeness of furnish at machine chest is maintained to a desired level by controlling the power of ultrasonic furnish agitators and/or the rotating speed of mechanical furnish agitators.

6. The process of claim 5 wherein controlling the power of ultrasonic furnish agitators and/or the rotating speed of mechanical furnish agitators is achieved by on-line freeness detectors installed at both the input and output of said agitators.

7. The process of claim 1 wherein the furnish is a mixture of stock and water and the stock is a pulp recycled from old corrugated cartons, old kraft paper sacks, waste paper and mixture thereof, the improvement comprising eliminating fibril fragments from the furnish.

8. The process of claim 1 wherein the removing fibril fragments is achieved by enlarging screen holes and/or controlling the rotating speed of screens of said fiber extractor.

9. The process of claim 8 wherein the consistency of the furnish extracted is monitored and fed back to the rotating speed controlling apparatus to achieve efficient removal of fibril fragments from the said furnish.

10. The process of claim 1 wherein the furnish is a mixture of stock and water and stock is a pulp recycled from old corrugated cartons, old kraft paper sacks, waste paper and mixture thereof, the improvement further comprising applying NaOH to said mixture at a pulper in the stock preparation line.

11. The process of claim 1 wherein the furnish is a mixture of stock and water and the stock is a pulp recycled from old corrugated cartons, old kraft paper sacks, waste paper and mixture thereof, the improvement further comprising adding alum to said furnish to neutralize NaOH in the furnish.

* * * * *